3,093,621
SULFUR-CURABLE ELASTOMERIC COPOLYMERS OF ETHYLENE, α-OLEFINS, AND 5-METHYL-ENE-2-NORBORNENE
Edward K. Gladding, New Castle, Del., assignor to E. I. du Pont de Nemours and Company, Wilmington, Del., a corporation of Delaware
No Drawing. Filed Mar. 29, 1960, Ser. No. 18,263
7 Claims. (Cl. 260—80.5)

This invention is directed to new hydrocarbon polymers which may be readily sulfur-cured to form highly useful elastomers.

Alpha olefins, such as ethylene and propylene, are very important polymer intermediates because they are commercially available in great volume at very low cost. It is known that they can be copolymerized to give products ranging in form from low molecular weight oils to high molecular weight solids.

Unfortunately, these copolymers are not convenient to cure. Unlike natural rubber, GRS, or butyl rubber, they contain essentially no ethylenic unsaturation which can be sulfur cured; thus, the curing procedures familiar to the trade cannot be used. Alternative methods for curing, such as the use of high energy radiation or the employment of organic peroxides, are more expensive and may limit the choice of antioxidants which can be incorporated in the uncured elastomer.

It is known that hydrocarbon copolymers having open-chain diolefin monomer units incorporated therein can be sulfur cured. However, these copolymers have either required difficultly accessible diolefins or they have been difficult to prepare in acceptable yields. Some of the diolefins interfere with the polymerization by poisoning the catalyst or lowering its productivity. Many of the diolefins are not copolymerized efficiently into the copolymer. The unreacted diolefin monomer then presents recovery and recycling problems which are inconvenient and economically undesirable.

It is known that sulfur-curable elastomers can be made by copolymerizing ethylene, propylene, and dicyclopentadiene. This copolymer, unfortunately, cures too slowly with sulfur to be entirely satisfactory. A suitable state of cure can be obtained, but an uneconomically large proportion of dicyclopentadiene monomer units must then be present in the copolymer or an undesirably long cure time must then be used. Also, undesirably large amounts of sulfur must be used and this causes the vulcanizates to have poor heat aging properties.

It is, therefore, an object of this invention to provide a new hydrocarbon elastomer. It is a further object of the present invention to provide a new hydrocarbon elastomer which is readily sulfur-curable. It is a still further object to provide a process for preparing these new elastomers and to provide a process for curing same. These and other objects will become apparent in the following description and claims.

More specifically, the present invention is directed to a rubbery copolymer of ethylene, at least one alpha olefin having the structure R—CH=CH$_2$ where R is a $C_1$—$C_8$ alkyl radical, and 5-methylene-2-norbornene, said copolymer having an iodine number between 5 and 60 and containing at least about 20% ethylene units by weight and at least about 25% of said alpha olefin units by weight.

The copolymers made according to the present process are readily sulfur cured; a satisfactory modulus being quickly attained. When, however, dicyclopentadiene is substituted for the presently employed diolefins, the copolymers obtained are slower curing.

The novel copolymers of the present invention can be prepared by contacting ethylene, at least one alpha olefin as described, and 5-methylene-2-norbornene in solution in specific inert solvents with specific coordination catalysts, as hereinafter described, at temperatures between about 20° C. and 100° C., at atmospheric or superatmospheric pressure; and, in the absence of oxygen, water vapor, and carbon dioxide. The copolymers obtained as a result of this process are rubbery, high molecular weight elastomers capable of being sulfur-cured to form elastomeric vulcanizates.

Representative examples of the useful monoolefins having the structure R—CH=CH$_2$ are: propylene; 1-butene; 4-methyl-1-pentene; 1-pentene; 1-hexene; 1-heptene; 1-octene; 1-nonene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 6-methyl-1-heptene; 4,4-dimethyl-1-hexene; and 5,6,6-trimethyl-1-heptene.

The hydrocarbon diolefin useful in the present invention is 5-methylene-2-norbornene.

5-methylene-2-norbornene may be described by the following structural formula

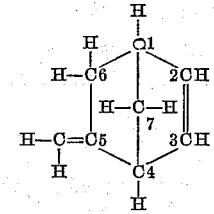

To obtain 5-methylene-2-norbornene, allene having the formula

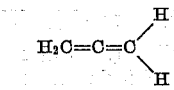

is heated in the absence of a polymerization initiator with cyclopentadiene.

Preferably the reaction is carried out at a temperature of 175–225° C. and still more preferably above 200° C. and in the presence of an addition polymerization inhibitor. The broad temperature operating range is generally between about 150° and 250° C.

The pressure under which this reaction is carried out is not critical. Good results are obtained when the reactants are heated in a closed container under the autogenous pressure developed by the reactants under the operating conditions.

The reaction vessel can be constructed of any material which is inert to the reactants and is capable of withstanding the operating pressures. Reaction vessels made of glass, stainless steel and glass-lined steel are quite satisfactory.

The reaction time can be varied widely. Times ranging from 2–24 hours or more at 150° C. to 250° C. are operable. Very good results are obtained in reaction periods ranging from 4 to 16 hours.

Reactants which are commercially available in the grades used for polymerization are satisfactory for use in making 5-methylene-2-norbornene. However, best results are obtained when the allene is relatively pure.

The ethylene monomer unit concentration ranges in general from about 20% to about 72.5% by weight. Copolymers having more ethylene monomer units tend to be stiff and nonelastomeric. The concentration of R—CH=CH$_2$ monomer units ranges in general from about 25% to about 77.5% by weight. Copolymers having a higher propylene content are known to be leathery and boardy.

The 5-methylene-2-norbornene diolefin monomer units should be present in sufficient amount to provide for sulfur curability i.e.—at least about 0.03 gram-moles per 100 grams of elastomer—while the maximum amount present by weight should be such as to not interfere seriously with the elastic character of the product—i.e. not over about 20% by weight.

As another indication of adequate curability, the iodine number of the copolymer should be at least 5. The iodine number is a measure of the total unsaturation of the polymer and this unsaturation arises from two sources (1) the methylene radical of 5-methylene-2-norbornene and (2) the terminal groups of the polymer chain which, based on infrared evidence, have a double bond of the vinylidene type:

Iodine numbers in excess of about 60 are undesirable in that values higher than this are not needed for curability and may indicate the presence of excessive amounts of diene component.

Representative examples of the copolymers within the scope of the present invention include:

Ethylene/propylene/5-methylene-2-norbornene;
Ethylene/1-butene/5-methylene-2-norbornene;
Ethylene/1-decene/5-methylene-2-norbornene;
Ethylene/5,5-dimethyl-1-octene/5-methylene-2-norbornene;
Ethylene/4-methyl-1-hexene/5-methylene-2-norbornene;
Ethylene/4,4-dimethyl-1-pentene/5-methylene-2-norbornene;
Ethylene/5,6,6-trimethyl-1-heptene/5-methylene-2-norbornene.

The coordination catalyst used in preparing the copolymers of this invention is made by mixing vanadium tetrachloride or vanadium oxytrichloride (also called vanadyl chloride) with a reducing compound having the structure

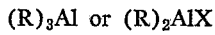

where R is $C_1$—$C_{12}$ alkyl (such as ethyl, isobutyl, octyl, or dodecyl) and X is a chlorine atom or a bromine atom; the preferred organoaluminum compound is aluminum triisobutyl. The relative proportions of the vanadium salt and the organoaluminum compound may be varied so that the value of the molar ratio of aluminum to vanadium ranges between about 1:1 to 10:1. The preferred concentration of the vanadium salt in the copolymerization reaction zone is about $5 \times 10^{-4}$ to $5 \times 10^{-3}$ moles/liter; however, higher of lower concentrations can be employed. The catalyst may be premixed or it may be formed in situ in the reaction zone.

The preferred solvent is tetrachloroethylene. Liquid paraffins and cycloparaffins such as neopentane, isopentane, pentane, cyclopentane, n-hexane, cyclohexane, n-heptane, 2,2,4-trimethylpentane, methylcylohexane, and n-octane can be used. Fluorochloro substituted liquid paraffins are also suitable, as for example, trichlorofluoromethane.

In a typical procedure a glass reaction vessel, equipped with a glass agitator, gas inlet and outlet tubes and openings to permit the introduction of liquid reagents, is charged under nitrogen with tetrachloroethylene which has been purified by distillation from calcium hydride or by passage through a column of silica gel.

Agitation is started and a mixture of ethylene and propylene gases is continuously introduced through the gas-inlet tube below the liquid surface. The nitrogen inflow is discontinued. The relative amounts of ethylene and propylene in the gas feed stream are controlled by suitably calibrated rotameters which are placed in the gas feed lines ahead of the T in which the gases are mixed. Prior to their introduction into the reactor, the gases are purifed from oxygen, water vapor and other contaminants reactable with aluminum triisobutyl by passage through a scrubber containing aluminum triisobutyl.

After the ethylene-propylene mixture has been introduced for 3 to 5 minutes, the tetrachloroethylene is substantially saturated with each monomer. Monomer inflow is continued and excess gas is allowed to escape through the gas outlet tube through a bubble-trap filled with "Nujol," a liquid petrolatum of specific gravity 0.88–0.90 at 60° F. (available from Plough, Inc., Memphis, Tenn.), to prevent back-flow of air. 5-methylene-2-norbornene, aluminum triisobutyl and vanadium oxytrichloride are then added, in turn, to the tetrachloroethylene solution of ethylene and propylene by means of hypodermic needles through an opening in the reactor sealed with a soft rubber serum cap. The amount of vanadium oxytrichloride added is such that the vanadium concentration in the reaction mass is $5 \times 10^{-4}$ to $5 \times 10^{-3}$ moles/liter. Reaction occurs at once and an intense blue-violet color appears. The monomers are consumed and the temperature of the charge rises. Cooling may be applied, when desired. The concentration of copolymer reaches about 1 to 5 percent by weight in about 20 to 80 minutes when the temperature of the charge ranges between 20° and 60° C. As the copolymerization proceeds, the charge becomes increasingly viscous; it is generally convenient to stop the reaction before the copolymer concentration exceeds about 5% by weight.

In operating the copolymerization process, in general, all of the diolefin may be present before the catalyst is added; alternatively, part or all of the diolefin may be added during the copolymerization; this introduction may be continuous, or, intermittent.

The catalyst is deactivated by introduction of a low molecular weight alcohol to the reaction mass; representative reagents are isopropanol and n-butanol. The copolymer solution is then extracted with dilute (5–10%) hydrochloric acid, washed with water until acid-free, and introduced onto a hot rotating drum; the solvent is flashed off, leaving a band of copolymer which is subsequently scraped from the drum by a doctor knife; alternatively, the solvent may be evaporated and the copolymer subsequently dried by milling on a rubber roll mill. An antioxidant, such as 2,2'-methylene-bis(6-tert-butyl-4-methylphenol) or 4,4'-thiobis(2-tert-butyl-5-methylphenol), is incorporated prior to the drying operation to avoid possible oxidation and degradation of the copolymer.

The novel copolymers of this invention are rubbery in nature and may be cured to form highly useful elastomers. Any one of a wide variety of curing procedures may be employed. As has been mentioned above, the copolymers may be readily cured with sulfur. Any of the procedures familiar to those skilled in the processing of natural rubber, butadiene-styrene rubber (SBR), and butyl rubber are suitable.

Various procedures and modifications of sulfur curing are described in Encyclopedia of Chemical Technology, Kirk and Orthmer, published by Interscience Encyclopedia, Inc., New York, 1953, vol. 11, pages 892–927; Principles of High-Polymer Theory and Practice, Schmidt and Marlies, published by McGraw-Hill Book Co., Inc., New York, 1948, pages 556–566; and Chemistry and Technology of Rubber, Davis and Blake, published by Reinhold Publishing Corporation, New York, 1937, chapter VI. Typical procedures are illustrated in the examples which follow.

In place of sulfur curing, which is preferred, one may employ a free radical cure.

In carrying out a free radical cure of the copolymers, it is merely necessary to mix, by standard procedures, a free radical generator with the copolymer and to heat until a cure is obtained. The temperature range may vary within wide limits, depending upon the particular free radical generator being used. However, heating to temperatures of about 50°–175° C. for a period of 30 minutes to several hours is ordinarily adequate. Longer times may be used in the case of the more thermally stable free radical generators.

The preferred free radical generators which may be incorporated with the copolymers are organic peroxides. Representative examples are bis(alpha,alpha-dimethylbenzyl) peroxide, dibenzoyl peroxide, di-tert-butyl peroxide, cumene hydroperoxide, methyl ethyl ketone peroxide, tert-butyl perbenzoate and di-N-methyl tert-butyl percarbamate. Bis(alpha,alpha-dimethylbenzyl) peroxide, often called dicumyl peroxide, is particularly preferred. About 2.5 to 3 parts by weight is used for every 100 parts by weight of the copolymer. The compounded stock is then cured at about 150° C. for about 30 to 60 minutes.

In addition to the free radical generator, a free radical acceptor may be present such as N-substituted maleimide, an N,N'-substituted bismaleimide, an N,N'-substituted bisacrylamide, a cyclic triacryloylhexahydrotriazine, or mixtures thereof. The quantity of free radical acceptor may range from about 0.5% to 6% by weight of the copolymer. The weight of the free radical acceptor may be less, equal to, or more than the weight of the free radical generator.

The maleimides are compounds having the formula:

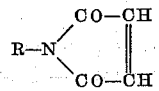

wherein R is an alkyl or an aryl radical. Representative maleimides include compounds such as N-methyl maleimide, N-phenyl maleimide and N-pyrenyl maleimide. The bismaleimides may be represented by the formula:

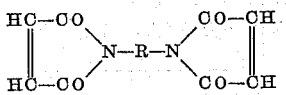

wherein R is an alkylene or an arylene radical. Representative bismaleimides include N,N'-ethylene bismaleimide, N,N'-phenylene bismaleimide and N,N'-pyrenylene bismaleimide. The bisacrylamides which may be used in the process of the present invention may be represented by the formula:

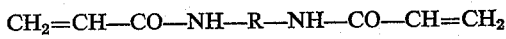

wherein R is an alkylene or an arylene radical. Representative compounds include methylene bisacrylamide and phenylene bisacrylamide.

A wide variety of compounding agents may be incorporated with these copolymers at the time they are cured in order to improve various properties. Thus, they may be loaded with carbon black in order to increase the tensile strength. Other compounding agents include titanium dioxide and silica.

The copolymers of this invention have many varied uses. They may be employed in the preparation of tires, inner tubes, belts, hose and tubing, wire and cable jackets, footwear, sponges, coated fabrics, and a wide variety of coated or molded articles. They are characterized by good thermal stability and excellent resistance to ozone. The uncured but compounded copolymers are not affected by moisture but can be stored for lengthy periods before shaping and vulcanizing.

The copolymers of the present invention can be prepared by a continuous process at atmospheric or superatmospheric pressure.

Thus, solvent, monomers and catalyst may be introduced continuously into a polymerization zone at such a rate as to provide a residence time sufficient to build up the desired concentration of copolymer in the polymerization mass. The residence time may vary widely, from, say, 10 minutes to several hours or more. In general, the residence time will be shorter as the concentrations of monomers and catalysts in the feed stream are increased.

The copolymer solution which continually overflows from the polymerization zone is contacted in a subsequent zone with a catalyst deactivator; the copolymer is ultimately continually obtained after suitable continuous purification and isolation procedures.

Representative examples illustrating the present invention are as follows.

EXAMPLE 1

*Part A.—Preparation and Curing of Ethylene/Propylene/ 5-Methylene-2-Norbornene Copolymer*

All apparatus except the hose connections and the traps for holding the aluminum triisobutyl was flame-dried while being swept with nitrogen; thereafter a constant nitrogen sweep was supplied until introduction of the gaseous monomers; this operation was carried out to prevent contamination by atmospheric oxygen and water vapor.

A one-liter glass resin flask fitted with a glass paddle agitator, a thermometer, gas inlet and outlet tubes, and an opening to permit the introduction of liquid reagents, was charged under nitrogen at room temperature with one-liter of silica-gel-purified, nitrogen-sparged tetrachloroethylene. Agitation was begun. A gaseous monomer mixture was then introduced through the gas inlet tube below the tetrachloroethylene surface to supply ethylene and propylene at the respective rates of 1,000 cc./minute and 2300 cc./minute (molar proportions 1:2.3). The relative amounts of the monomers in this feed stream were controlled by suitably calibrated rotameters which were placed in the individual monomer feed lines ahead of the T in which the gases were mixed. Before it entered the resin flask, the mixture passed, in turn, through a column packed with silica gel, a column packed with sodium hydroxide supported on asbestos, two traps filled with aluminum triisobutyl, and a trap filled with a liquid petrolatum of specific gravity 0.88–0.90 (at 60° F.) available from Plough, Inc., Memphis, Tenn, as "Nujol." The tetrachloroethylene in the resin flask became saturated with ethylene and propylene. Excess gas was allowed to escape through the gas outlet tube into a bubble-trap filled with "Nujol" to prevent backflow of air into the resin flask.

After the monomer gas mixture had been fed for about 5 minutes, flame-dried nitrogen-flushed syringes were used to introduce, in turn, 1.59 grams (0.015 mole) of 5-methylene-2-norbornene, 4 milliliters (0.004 mole) of a tetrachloroethylene solution 1.0 molar in aluminum triisobtuyl, and 1.0 milliliter (0.0012 mole) of a tetrachloroethylene solution 1.2 molar in vanadium oxytrichloride into the resin flask. The color of the contents of the resin flask mixture changed from violet to amber, monomer gases were absorbed rapidly, and the temperature rose to a maximum of 48° C. Although the solution remained homogeneous and clear amber throughout the following 60 minutes, it became steadily more viscous.

The catalyst was then deactivated by the addition of 10 milliliters of n-butanol to the reaction mixture. Monomer gas inflow was stopped. A nitrogen sweep was provided. After the reaction mixture had been filtered through cheese cloth, the filtrate was acid-washed three times with 10% hydrochloric acid and then washed acid-free with 2 volumes of water. After the organic layer had been separated and allowed to evaporate overnight at room temperature, the slab obtained was dried on a rubber roll mill while 0.1% by weight 4,4'-thiobis(2-tert-butyl-5-methyl phenol) antioxidant was added. 20.5 grams of a rubbery copolymer was obtained exhibiting an iodine number of 23.2 and containing, by weight, 48% propylene monomer units.

10 grams of the above copolymer was compounded on a rubber roll mill with 4 grams of superabrasion furnace black, 0.5 gram of zinc oxide, 0.1 gram of stearic acid, 0.1 gram of N-phenyl-beta-naphthylamine, 0.15 gram of tellurium diethyldithiocarbamate, 0.075 gram of tetramethyl thiuram disulfide, and 0.2 gram of sulfur.

The stock obtained was heated at 150° C. for one hour in a mold to give cured rubbery slabs 5" x 1" x 0.06–0.08". They were subsequently cut into ¼" strips and tested at 25° C. with an "Instron" machine (load 50 lbs., head speed 20 in./min.). The vulcanizate displayed the following properties at 25° C.: modulus at 200% extension: 2080 lb./sq. in.; tensile strength, 2440 lb./sq. in.; extension at the break, 240%.

*Part B.—Preparation and Curing of Ethylene/Propylene/ Dicyclopentadiene Copolymer*

The procedure of Part A was repeated except that 0.015 mole of dicyclopentadiene was substituted for the 0.015 mole of 5-methylene-2-norbornene called for; the maximum temperature attained during the copolymerization was 48° C. instead of 44° C.; and the reaction time was 65 minutes instead of 60 minutes. The copolymer obtained (25.6 grams) exhibited an iodine number of 17 and contained, by weight, about 53% propylene units. It was cured and tested by the same procedure described in part A above. At 25° C., the vulcanizate displayed a modulus at 200% extension of only 630 lb./sq. in.

It is to be understood that one may substitute any of the heretofore described specie alpha olefins, and mixtures thereof, said alpha olefins having the structure R—CH=$CH_2$ in the preceding example to give substantially the same results. R in this monoolefin is a $C_1$—$C_8$ alkyl radical.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A copolymer which is sulfur-curable to an elastomeric vulcanizate, said copolymer being of ethylene, at least 1 alpha olefin having the structure of R—CH=$CH_2$ wherein R is a $C_1$—$C_8$ alkyl radical, and 5-methylene-2-norbornene, said copolymer containing at least about 20% ethylene units by weight, at least 25% of said alpha olefin units by weight, and at least about 0.03 gram-moles per 100 grams of said copolymer and not over about 20% by weight of said copolymer of said 5-methylene-2-norbornene.

2. A copolymer which is sulfur-curable to an elastomeric vulcanizate, said copolymer being of ethylene, at least 1 alpha olefin having the structure R—CH=$CH_2$ wherein R is a $C_1$—$C_8$ alkyl radical, and 5-methylene-2-norbornene, said copolymer having an iodine number between 5 and 60, and said copolymer containing at least about 20% ethylene units by weight and at least 25% of said alpha olefin units by weight, and, at least about 0.03 gram-moles per 100 grams of said copolymer and not over about 20% by weight of said copolymer of said 5-methylene-2-norbornene.

3. A copolymer of claim 1 sulfur-cured to an elastomeric vulcanizate.

4. The copolymer of claim 1, wherein said alpha-olefin having the structure R—CH=$CH_2$ is propylene.

5. The copolymer of claim 1, wherein said alpha-olefin having the structure R—CH=$CH_2$ is 1-butene.

6. The copolymer of claim 1, wherein said alpha-olefin having the structure R—CH=$CH_2$ is 1-pentene.

7. The copolymer of claim 1, wherein said alpha-olefin having the structure R—CH=$CH_2$ is 1-hexene.

References Cited in the file of this patent

UNITED STATES PATENTS

| | | |
|---|---|---|
| 2,373,706 | Ott | Apr. 17, 1945 |
| 2,868,772 | Ray et al. | Jan. 13, 1959 |